United States Patent [19]

Brehm

[11] Patent Number: 4,898,028
[45] Date of Patent: Feb. 6, 1990

[54] PISTON FOR A HIGH-ENTHALPY WIND TUNNEL

[75] Inventor: Lothar Brehm, Frankfurt, Fed. Rep. of Germany

[73] Assignee: Metallgesellschaft Aktiengesellschaft, Frankfurt am Main, Fed. Rep. of Germany

[21] Appl. No.: 301,777

[22] Filed: Jan. 25, 1989

[30] Foreign Application Priority Data

Feb. 10, 1988 [DE] Fed. Rep. of Germany ....... 3804044

[51] Int. Cl.$^4$ ............................................. G01M 9/00
[52] U.S. Cl. ...................................................... 73/147
[58] Field of Search ........................................... 73/147

[56] References Cited

U.S. PATENT DOCUMENTS 3,983,749 10/1976 Fletcher ................................. 73/147
4,363,237 12/1982 Creel, Jr. et al. ...................... 73/147

Primary Examiner—Donald O. Woodiel
Attorney, Agent, or Firm—Sprung Horn Kramer & Woods

[57] ABSTRACT

A piston is provided which serves to produce a pressure surge in a wind tunnel. Under the action of a gas pressure of at least 20 bars the piston is propelled in a first passage from an initial position to a target surface. Under the compression produced by the approaching piston, a diaphragm disposed at the end of the first passage is torn. The resulting pressure surge is transmitted in a second passage, which is filled with a testing gas, to a thin sheet. That thin sheet is torn so that the testing gas can enter a testing chamber as a supersonic shock wave. The piston is provided at its rear end with a locking extension, which cooperates with a stationary holder when the piston is in its initial position.

5 Claims, 1 Drawing Sheet

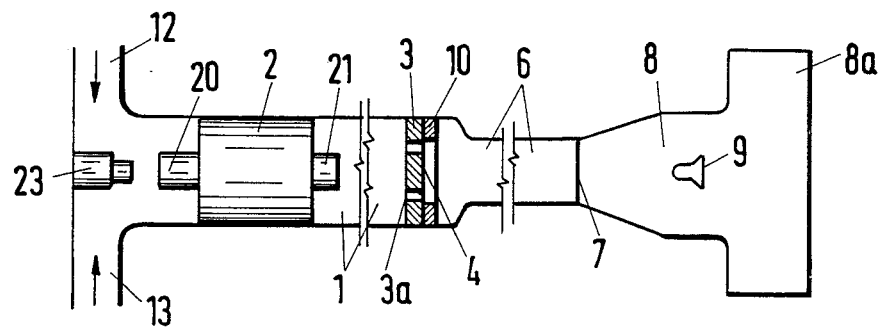
Fig. 1
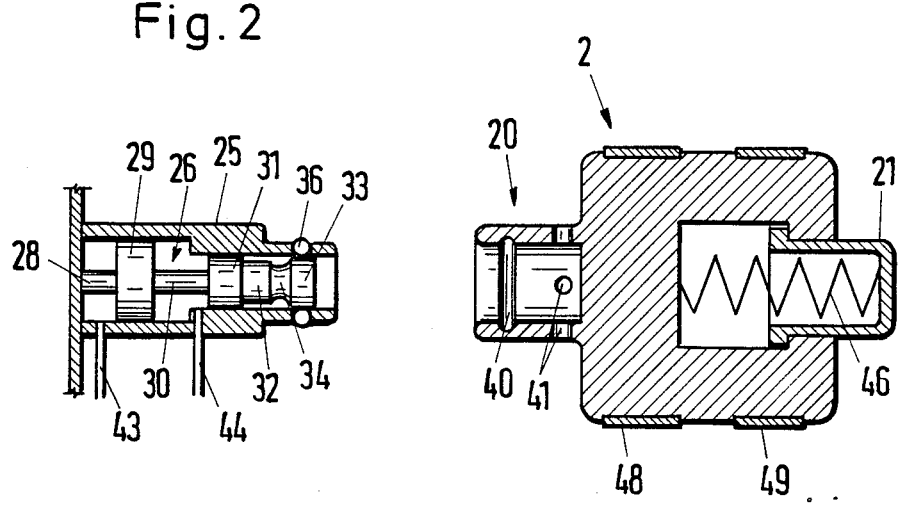
Fig. 2
Fig. 3

PISTON FOR A HIGH-ENTHALPY WIND TUNNEL

BACKGROUND OF THE INVENTION

This invention relates to a piston for producing a pressure surge in a wind tunnel, wherein the piston is propelled under the action of a gas pressure of at least 20 bars in a first passage from an initial position to a target surface so that a diaphragm disposed at the end of the first passage is torn under the compression produced by the approaching piston, and the resulting pressure surge is transmitted by a second passage, that is filled with a testing gas, to a thin sheet so that the latter is torn and the test gas flows as a supersonic shock wave into a testing chamber.

SUMMARY OF THE INVENTION

It is an object of the invention to provide a piston which is reliable in operation and to ensure that the piston will not depart from its initial position inadvertently or owing to a failure of a seal but will depart from that position only under an action controlled from the outside. In the device described first hereinbefore this is accomplished in that the piston is provided at its rear end with a locking extension, which when the piston is in its initial position cooperates with a stationary holder, which is provided with disengageable locking means, which extend into the locking extension. Only when the locking means which are operable from the outside are disengaged will the piston be propelled by the gas pressure through the first passage toward the target surface. Because the gas pressure, which may be in the range from about 20 to about 500 bars, will fully act on the piston before the latter is released by the holder, the piston will be accelerated to a maximum velocity without a delay.

The piston is suitable for use in relatively large wind tunnels, such as high-enthalpy wind tunnels, which can be used to investigate model missiles to be tested under conditions under which, e.g., space missiles re-enter the atmosphere of the Earth. In such cases the weight of the piston may be in the range from about 200 to about 2000 kg.

Further features of the invention will be explained with reference to the drawing, in which

BRIEF DESCRIPTION OF THE DRAWING

FIG. 1 is a diagrammatic view showing the wind tunnel and the piston,

FIG. 2 is a longitudinal sectional view showing the holder and

FIG. 3 is a longitudinal sectional view showing the piston.

DETAILED DESCRIPTION OF THE INVENTION

The high-enthalpy wind tunnel shown in FIG. 1 essentially comprises a first passage 1, in which a piston 2 is moved, a stationary target plate 3, a diaphragm 4 disposed behind the target plate 3, a second passage 6, a thin sheet 7 disposed at the end of the second passage 6, a testing chamber 8 and a test specimen 9, which is disposed in the testing chamber 8. A propelling gas, in most cases air, is supplied from one or more pressurized containers, not shown, through inlets 12 and 13 so that a gas pressure of 20 bars or more will be applied to the piston 2 and will accelerate the piston 2 toward the target plate 3. The piston is provided at its trailing end with a locking extension 20 and at its leading end with a buffer 21.

As the flying piston 2 moves toward the target plate 3, the gas disposed between the piston and the plate is progressively compressed. The resulting gas pressure is transmitted through a plurality of holes 3a in the plate 3 to the diaphragm 4 which is disposed behind that plate. The rim of the diaphragm is held by detachable ring 10. When the compression effected by the approaching piston is sufficient, the diaphragm will be torn so that a pressure surge will enter the second passage 6. That second passage is filled with a testing gas, such as air, oxygen or helium. The pressure surge is transmitted through that testing gas to the right as far as to the thin sheet and tears that thin sheet. As a result, a surge of the testing gas enters the evacuated testing chamber 8 and impinges on the test specimen 9. The behavior of the test specimen 9 under that pressure surge is recorded by methods of investigation which are known per se and are not illustrated here. Behind the test specimen 9 the testing chamber 8 is enlarged to form a gas container 8a, which receives the approaching testing gas.

For instance, the first passage 1 may have a length between 10 and 50 meters and may be 0.3 to 1.0 meter in diameter. The second passage 6 may have a length of 10 to 40 meters and may be 0.1 to 0.5 meters in diameter.

A stationary holder 23 is provided for retaining the piston 2 in its initial position and for releasing the piston only in response to a control action from the outside. The locking extension 20 of the piston 2 fits the holder 23, as shown in FIGS. 2 and 3. The holder comprises a stationary cylindrical housing 25, which contains a movable locking piston 26. The piston 26 consists of a supporting stem 28, a rear piston section 29, a connecting stem 30, a forward piston section 31 and a locking extension 32. The latter has a cylindrical head 33 and a constricted neck 34. The head 33 and the neck 34 cooperate in alternation with a plurality of balls 36, which are held in the constricted forward portion of the housing 25.

With reference to FIG. 3, with the locking piston 26 moved forward so that constricted neck 34 is below balls 36, the locking extension 20 of the piston 2 is slidably moved onto the forward end of the housing 25 of the holder 23 when the piston 2 is to be locked in its initial position. As a result, the balls 36 enter the annular groove 40 formed in the inside surface of the extension 20. The locking piston 26 is then moved into the position shown in FIG. 2 and with its head 33 retains the balls 36 in the annular groove 40. The extension 20 is formed with openings 41, through which the ambient gas pressure can enter the extension 20 and can act on the head 33 to hold it in the locking position. This will prevent an inadvertent release of the piston 2 by the holder 23.

When the piston 2 is to be unlocked and released, pressure is applied from the outside via the line 43 (FIG. 2) to the rear piston section 29 so that the locking piston is pushed forward until its constricted neck 34 is disposed under the balls 36. The locking means consisting of the balls 36 are thus disengaged and the gas pressure applied via lines 12 and 13 can accelerate the piston 2 so that it is propelled to the target plate 3. To return the locking piston 26 to the locking position shown in FIG. 2, hydraulic or pneumatic pressure is applied through line 44 to the interior of the housing 25 in the region between the larger rear piston section 29 and the smaller forward piston section 31 so that the locking piston is returned to its locking position.

As is apparent from FIG. 3 the piston 2 is provided with a buffer 21, which cooperates with diagrammatically indicated spring elements 46, which damp the impact of the piston 2 on the target plate 3. The piston 2 is provided on its outside surface with elastic sliding rings 48, 49, which act as seals between the piston 2 and the inside of the first passage 1.

What is claimed is:

1. In a wind tunnel assembly having first and second passages, a test chamber and means for producing a pressure surge including a diaphragm at the end of the first passage, a thin sheet at the end of the second passage, the second passage is filled with a test gas, a piston, means mounting the piston for movement under the action of a gas pressure of at least 20 bars in the first passage from an initial position to a target surface so that the diaphragm disposed at the end of the first passage is torn under the compression produced by the approaching piston, and the resulting pressure surge is transmitted by the second passage, that is filled with the test gas, to the thin sheet to tear the sheet and effect the flow of the test gas as a supersonic shock wave into the test chamber, first locking means disposed at a rear portion of the piston and a stationary holder having second locking means cooperative with the first locking means when the piston is in its initial position.

2. The assembly according to claim 1, wherein the piston has a buffer at a first end thereof.

3. The assembly according to claim 1, wherein the first locking means comprises a sleeve having an internal annular groove and the second locking means comprises radially movable balls, and means for moving the balls into a locking position wherein the balls extend into the annular groove.

4. The assembly according to claim 3, wherein the means for moving the balls comprises a hydraulically or pneumatically operable locking piston having a controlling extension for acting on the balls.

5. The assembly according to claim 4, wherein the locking piston comprises at least one stage and is mechanically, pneumatically or hydraulically movable in opposite longitudinal directions.

* * * * *